US010754559B1

(12) United States Patent
Meiri et al.

(10) Patent No.: US 10,754,559 B1
(45) Date of Patent: Aug. 25, 2020

(54) ACTIVE-ACTIVE STORAGE CLUSTERING WITH CLOCK SYNCHRONIZATION

(71) Applicant: EMC IP Holding Company LLC, Hopkinton, MA (US)

(72) Inventors: David Meiri, Somerville, MA (US); Anton Kucherov, Dudley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/296,644

(22) Filed: Mar. 8, 2019

(51) Int. Cl.
*G06F 12/00* (2006.01)
*G06F 3/06* (2006.01)
*G06F 1/12* (2006.01)
*G06F 1/14* (2006.01)

(52) U.S. Cl.
CPC .............. *G06F 3/0619* (2013.01); *G06F 1/12* (2013.01); *G06F 1/14* (2013.01); *G06F 3/065* (2013.01); *G06F 3/0683* (2013.01)

(58) Field of Classification Search
CPC . G06F 3/0619; G06F 1/12; G06F 1/14; G06F 3/065; G06F 3/0683
See application file for complete search history.

(56) References Cited

U.S. PATENT DOCUMENTS

| 5,794,253 | A | * | 8/1998 | Norin .................... G06F 16/273 |
| 6,567,397 | B1 | | 5/2003 | Campana et al. |
| 6,687,746 | B1 | | 2/2004 | Shuster et al. |
| 6,697,875 | B1 | | 2/2004 | Wilson |
| 7,165,155 | B1 | | 1/2007 | Duprey et al. |
| 7,275,103 | B1 | | 9/2007 | Thrasher et al. |

(Continued)

FOREIGN PATENT DOCUMENTS

| CN | 103677927 B | 2/2017 |
| EP | 1117028 A2 | 7/2001 |

(Continued)

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Mano Padmanabhan
*Assistant Examiner* — Mohammad S Hasan
(74) *Attorney, Agent, or Firm* — Ryan, Mason & Lewis, LLP

(57) ABSTRACT

A first storage system is configured to participate in a replication process with a second storage system using an active-active configuration. A request for a time-to-live (TTL) grant is received in the first storage system from the second storage system. The first storage system computes an estimate of a difference between local times in the respective first and second storage systems, utilizes the computed estimate in the first storage system to determine a TTL expiration time in the local time in the second storage system, and sends the TTL grant with the TTL expiration time to the second storage system in response to the request. The computed estimate of the difference between the local times in the respective first and second storage systems is illustratively utilized in the first storage system to determine a range for the local time in the second storage system.

20 Claims, 8 Drawing Sheets

(56) References Cited

U.S. PATENT DOCUMENTS

| | | | |
|---|---|---|---|
| 7,440,982 B2 | 10/2008 | Lu et al. | |
| 7,444,464 B2 | 10/2008 | Urmston et al. | |
| 7,454,437 B1 | 11/2008 | Lavallee et al. | |
| 7,617,292 B2 | 11/2009 | Moore et al. | |
| 7,668,981 B1 | 2/2010 | Nagineni et al. | |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,890,664 B1 | 2/2011 | Tao et al. | |
| 7,904,681 B1 | 3/2011 | Bappe et al. | |
| 7,925,872 B2 | 4/2011 | Lai et al. | |
| 8,095,726 B1 | 1/2012 | O'Connell et al. | |
| 8,209,491 B2* | 6/2012 | Mobarak | G06F 16/2246 711/141 |
| 8,214,612 B1 | 7/2012 | Natanzon | |
| 8,250,256 B2 | 8/2012 | Ghosalkar et al. | |
| 8,285,825 B1 | 10/2012 | Nagaraj et al. | |
| 8,301,593 B2 | 10/2012 | Hoffmann et al. | |
| 8,335,899 B1 | 12/2012 | Meiri et al. | |
| 8,825,919 B1 | 9/2014 | Lim et al. | |
| 8,832,334 B2 | 9/2014 | Okita | |
| 8,874,746 B1 | 10/2014 | Gonzalez | |
| 8,918,602 B2* | 12/2014 | Antani | G06F 12/121 711/159 |
| 9,026,694 B1 | 5/2015 | Davidson et al. | |
| 9,104,326 B2 | 8/2015 | Frank et al. | |
| 9,201,803 B1 | 12/2015 | Derbeko et al. | |
| 9,208,162 B1 | 12/2015 | Hallak et al. | |
| 9,286,003 B1 | 3/2016 | Hallak et al. | |
| 9,400,611 B1 | 7/2016 | Raizen | |
| 9,430,368 B1 | 8/2016 | Derbeko et al. | |
| 9,514,014 B2 | 12/2016 | Webman et al. | |
| 9,552,258 B2 | 1/2017 | Hallak et al. | |
| 9,594,780 B1 | 3/2017 | Esposito et al. | |
| 9,606,870 B1 | 3/2017 | Meiri et al. | |
| 9,647,933 B1 | 5/2017 | Tawri et al. | |
| 9,672,160 B1 | 6/2017 | Derbeko et al. | |
| 9,716,754 B2 | 7/2017 | Swift | |
| 9,778,852 B1 | 10/2017 | Marshak et al. | |
| 9,880,946 B1* | 1/2018 | Yoder | G06F 12/121 |
| 9,891,994 B1 | 2/2018 | Schneider et al. | |
| 10,176,046 B1 | 1/2019 | Hu et al. | |
| 10,261,693 B1 | 4/2019 | Schneider et al. | |
| 10,289,325 B1 | 5/2019 | Bono | |
| 10,324,640 B1 | 6/2019 | Chen et al. | |
| 10,338,851 B1 | 7/2019 | Kronrod et al. | |
| 10,353,714 B1 | 7/2019 | Gokam et al. | |
| 10,359,965 B1 | 7/2019 | Stronge et al. | |
| 10,394,485 B1 | 8/2019 | Chen et al. | |
| 10,437,501 B1 | 10/2019 | Kucherov et al. | |
| 10,437,509 B1* | 10/2019 | Alexeev | G06F 3/0659 |
| 10,437,855 B1 | 10/2019 | Stronge et al. | |
| 10,439,878 B1 | 10/2019 | Tah et al. | |
| 10,466,925 B1 | 11/2019 | Blanco et al. | |
| 10,474,367 B1 | 11/2019 | Mallick et al. | |
| 10,476,960 B1 | 11/2019 | Rao et al. | |
| 10,496,324 B2 | 12/2019 | Meiri et al. | |
| 10,496,489 B1 | 12/2019 | Chen et al. | |
| 10,496,672 B2 | 12/2019 | Meiri et al. | |
| 10,521,369 B1 | 12/2019 | Mallick et al. | |
| 10,558,613 B1 | 2/2020 | Shveidel et al. | |
| 10,592,159 B2 | 3/2020 | Kucherov et al. | |
| 10,592,161 B1 | 3/2020 | Chen et al. | |
| 10,606,496 B1 | 3/2020 | Mallick et al. | |
| 10,606,519 B1 | 3/2020 | Shveidel | |
| 10,637,917 B2 | 4/2020 | Mallick et al. | |
| 10,652,206 B1 | 5/2020 | Pusalkar et al. | |
| 2002/0023151 A1 | 2/2002 | Iwatani | |
| 2002/0103923 A1 | 8/2002 | Cherian et al. | |
| 2002/0133491 A1* | 9/2002 | Sim | H04L 67/1008 |
| 2004/0010563 A1 | 1/2004 | Forte et al. | |
| 2005/0228902 A1* | 10/2005 | Lienhart | G06F 1/12 709/248 |
| 2006/0026346 A1 | 2/2006 | Kadoiri et al. | |
| 2006/0236047 A1* | 10/2006 | Shitomi | G06F 11/1662 711/162 |
| 2006/0277383 A1 | 12/2006 | Hayden et al. | |
| 2007/0022121 A1 | 1/2007 | Bahar et al. | |
| 2007/0118453 A1* | 5/2007 | Bauerschmidt | G06Q 40/04 705/36 R |
| 2007/0118455 A1* | 5/2007 | Albert | G06Q 40/04 705/37 |
| 2007/0174849 A1 | 7/2007 | Cheung et al. | |
| 2007/0198790 A1* | 8/2007 | Asano | G06F 3/0605 711/162 |
| 2008/0043973 A1 | 2/2008 | Lai et al. | |
| 2008/0201458 A1 | 8/2008 | Salli | |
| 2008/0279462 A1 | 11/2008 | Celi, Jr. | |
| 2008/0301332 A1 | 12/2008 | Butler et al. | |
| 2009/0063587 A1* | 3/2009 | Jakob | G06F 11/2094 |
| 2009/0132955 A1 | 5/2009 | Garg et al. | |
| 2009/0259749 A1 | 10/2009 | Barrett et al. | |
| 2009/0276593 A1 | 11/2009 | Jacobson et al. | |
| 2010/0179941 A1 | 7/2010 | Agrawal et al. | |
| 2010/0313063 A1 | 12/2010 | Venkataraja et al. | |
| 2011/0010463 A1* | 1/2011 | Christenson | H04L 29/12066 709/245 |
| 2011/0022566 A1 | 1/2011 | Beaverson et al. | |
| 2011/0082836 A1* | 4/2011 | Wang | G06F 16/1787 707/649 |
| 2011/0197027 A1 | 8/2011 | Balasubramanian et al. | |
| 2011/0225123 A1 | 9/2011 | D'Souza et al. | |
| 2011/0296230 A1 | 12/2011 | Chen et al. | |
| 2012/0102369 A1 | 4/2012 | Hiltunen et al. | |
| 2012/0124282 A1 | 5/2012 | Frank et al. | |
| 2012/0246345 A1 | 9/2012 | Contreras et al. | |
| 2013/0117766 A1 | 5/2013 | Bax et al. | |
| 2013/0163617 A1* | 6/2013 | Chandra | H04J 3/0667 370/503 |
| 2013/0188562 A1* | 7/2013 | Espina Perez | H04W 28/0226 370/328 |
| 2013/0305002 A1 | 11/2013 | Hallak et al. | |
| 2013/0325824 A1 | 12/2013 | Shoens | |
| 2013/0339551 A1 | 12/2013 | Flanagan et al. | |
| 2014/0105060 A1* | 4/2014 | Baillargeon | H04W 8/24 370/253 |
| 2014/0105068 A1 | 4/2014 | Xu | |
| 2014/0181016 A1 | 6/2014 | Whitehead et al. | |
| 2014/0244935 A1 | 8/2014 | Ezra et al. | |
| 2015/0074239 A1* | 3/2015 | Rajapakse | H04L 65/4076 709/219 |
| 2015/0222705 A1 | 8/2015 | Stephens | |
| 2015/0242134 A1 | 8/2015 | Takada et al. | |
| 2015/0295700 A1* | 10/2015 | Gomez Gutierrez | G06F 1/14 375/354 |
| 2015/0378766 A1 | 12/2015 | Beveridge et al. | |
| 2015/0378785 A1 | 12/2015 | Tarasuk-Levin et al. | |
| 2015/0381509 A1* | 12/2015 | Sreeramoju | H04L 47/365 370/252 |
| 2016/0092136 A1 | 3/2016 | Balakrishnan et al. | |
| 2016/0117113 A1 | 4/2016 | Li et al. | |
| 2016/0150012 A1 | 5/2016 | Barszczak et al. | |
| 2016/0170987 A1 | 6/2016 | Kesselman | |
| 2016/0202927 A1* | 7/2016 | Klarakis | G06F 3/0619 709/217 |
| 2016/0224259 A1* | 8/2016 | Ahrens | G06F 3/0619 |
| 2016/0261513 A1 | 9/2016 | Aingaran et al. | |
| 2016/0335003 A1 | 11/2016 | Ahmed et al. | |
| 2016/0345207 A1 | 11/2016 | Kwak et al. | |
| 2017/0075842 A1 | 3/2017 | Su et al. | |
| 2017/0185529 A1 | 6/2017 | Chhabra et al. | |
| 2017/0192857 A1* | 7/2017 | Meiri | G06F 11/1461 |
| 2017/0235507 A1 | 8/2017 | Sinha et al. | |
| 2018/0095873 A1 | 4/2018 | Nakagoe et al. | |
| 2018/0189635 A1 | 7/2018 | Olarig et al. | |
| 2018/0234393 A1* | 8/2018 | Gram | H04L 63/0428 |
| 2018/0253256 A1 | 9/2018 | Bharadwaj | |
| 2018/0260125 A1* | 9/2018 | Botes | G06F 16/275 |
| 2018/0317101 A1 | 11/2018 | Koue | |
| 2018/0356989 A1* | 12/2018 | Meister | G06F 11/2089 |
| 2019/0037016 A1* | 1/2019 | Saito | H04L 67/1095 |
| 2019/0095299 A1 | 3/2019 | Liu et al. | |

(56) References Cited

U.S. PATENT DOCUMENTS

| | | | |
|---|---|---|---|
| 2019/0102269 A1* | 4/2019 | Abouelwafa | G06F 3/061 |
| 2019/0108888 A1 | 4/2019 | Sarkar et al. | |
| 2019/0303490 A1 | 10/2019 | Chen et al. | |
| 2019/0334987 A1 | 10/2019 | Mallick et al. | |
| 2019/0392060 A1 | 12/2019 | Meiri et al. | |
| 2020/0019317 A1* | 1/2020 | Stronge | G06F 3/065 |
| 2020/0026616 A1 | 1/2020 | Hu et al. | |
| 2020/0097174 A1 | 3/2020 | Moore et al. | |
| 2020/0097203 A1 | 3/2020 | Mallick et al. | |
| 2020/0097363 A1 | 3/2020 | Moore et al. | |
| 2020/0097393 A1 | 3/2020 | Moore et al. | |
| 2020/0106698 A1 | 4/2020 | Rao et al. | |
| 2020/0110552 A1 | 4/2020 | Kumar et al. | |
| 2020/0112608 A1 | 4/2020 | Patel et al. | |
| 2020/0125276 A1 | 4/2020 | Shani et al. | |

FOREIGN PATENT DOCUMENTS

| | | |
|---|---|---|
| EP | 2667569 A1 | 11/2013 |
| WO | 2016111954 A1 | 7/2016 |
| WO | PCT/US2019/052549 | 12/2019 |
| WO | PCT/US2019/053204 | 12/2019 |
| WO | PCT/US2019/053473 | 12/2019 |
| WO | PCT/US2019/024885 | 1/2020 |
| WO | PCT/US2019/024900 | 1/2020 |
| WO | PCT/US2019/067144 | 5/2020 |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architechture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Kris Piepho, "Dell EMC SC Series Storage: Microsoft Multipath I/O," Dell EMC Best Practices, Jan. 2017, 57 pages.

VMWARE, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

NVM Express, "NVM Express, Revision 1.3," May 1, 2017, 282 pages.

U.S. Appl. No. 16/246,984 filed in the name of David Meiri et al. filed Jan. 14, 2019 and entitled "Storage Systems Configured with Time-to-Live Clustering for Replication in Active-Active Configuration."

U.S. Appl. No. 16/253,793 filed in the name of Yuval Harduf et al. filed Jan. 22, 2019, and entitled "Storage System with Data Consistency Checking in Synchronous Replication Using Active Snapshot Set."

U.S. Appl. No. 16/665,651 filed in the name of Lior Kamran et al. filed Oct. 28, 2019, and entitled "Recovery Flow with Reduced Address Lock Contention in a Content Addressable Storage System."

* cited by examiner

US 10,754,559 B1

ACTIVE-ACTIVE STORAGE CLUSTERING WITH CLOCK SYNCHRONIZATION

FIELD

The field relates generally to information processing systems, and more particularly to storage in information processing systems.

BACKGROUND

Many information processing systems are configured to replicate data from one storage system to another storage system, possibly at different physical sites. In some cases, such arrangements are utilized to support disaster recovery functionality within the information processing system. For example, an enterprise may replicate data from a production data center to a disaster recovery data center. In the event of a disaster at the production site, applications can be started at the disaster recovery site using the data that has been replicated to that site so that the enterprise can continue its business.

Data replication in these and other contexts can be implemented using asynchronous replication at certain times and synchronous replication at other times. For example, asynchronous replication may be configured to periodically transfer data in multiple cycles from a source site to a target site, while synchronous replication may be configured to mirror host writes from the source site to the target site as the writes are made at the source site. Storage systems participating in a replication process can therefore each be configured to support both asynchronous and synchronous replication modes.

Conventional approaches to data replication can be problematic under certain conditions. For example, first and second storage arrays or other types of storage systems configured for replication in an active-active configuration can have difficulty coordinating their respective views of time-to-live (TTL) values absent explicit synchronization between local clocks of the respective storage systems.

SUMMARY

Illustrative embodiments provide techniques for active-active storage clustering with clock synchronization. Such embodiments advantageously utilize efficient clock synchronization between first and second storage systems to facilitate accurate coordinated views of TTL values between the two storage systems.

In one embodiment, a first storage system is configured to participate in a replication process with a second storage system using an active-active configuration. A request for a TTL grant is received in the first storage system from the second storage system. The first storage system computes an estimate of a difference between local times in the respective first and second storage systems, utilizes the computed estimate in the first storage system to determine a TTL expiration time in the local time in the second storage system, and sends the TTL grant with the TTL expiration time to the second storage system in response to the request.

The local time in the first storage system may be derived from a first clock source of the first storage system, and the local time in the second storage system may be derived from a second clock source of the second storage system.

The computed estimate of the difference between the local times in the respective first and second storage systems is illustratively utilized in the first storage system to determine a range for the local time in the second storage system.

For example, the range determined in the first storage system for the local time in the second storage system in some embodiments is given by:

$$T_1+D_1-E_1 \le T_2 \le T_1+D_1+E_1,$$

where $T_1$ and $T_2$ are the local times in the respective first and second storage systems, $D_1$ is the computed estimate of the difference between the local times in the respective first and second storage systems, and $E_1$ is a maximum error between $D_1$ and an actual difference between the local times in the respective first and second storage systems.

In some embodiments, utilizing the computed estimate in the first storage system to determine a TTL expiration time in the local time in the second storage system comprises estimating the local time in the second storage system from the range, and determining the TTL expiration time based at least in part on the estimated local time in the second storage system.

The TTL expiration time maintained in the second storage system is updated in some embodiments based at least in part on the TTL expiration time received from the first storage system with the TTL grant.

In some embodiments, the first storage system is configured as a "leader" and provides a limited-time license or other type of TTL grant to the second storage system configured as a "follower." An exemplary TTL grant illustratively allows the follower to service input-output (IO) operations received from one or more host devices concurrently with the leader, such that both the leader and the follower are servicing IO operations. The active-active storage clustering with clock synchronization in these embodiments ensures that the leader can effectively revoke the TTL grant to the follower even in the presence of link failures or other communication issues that prevent the leader from communicating with the follower.

The first and second storage systems in the active-active configuration in some embodiments service IO operations that are received from at least one host device and directed to a designated consistency group. The consistency group illustratively comprises one or more logical storage volumes subject to replication in accordance with the replication process. The TTL grant illustratively controls a period of time for which the second storage system is permitted to service the IO operations.

The first and second storage systems illustratively comprise respective content addressable storage systems having respective sets of non-volatile memory storage devices. For example, the storage devices of the first and second storage systems in such embodiments can be configured to collectively provide respective all-flash storage arrays. The first and second storage systems may in some embodiments be associated with different physical sites. For example, the first storage system may be part of a production site data center and the second storage system may be part of a disaster recovery site data center. Numerous other storage system arrangements are possible in other embodiments.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
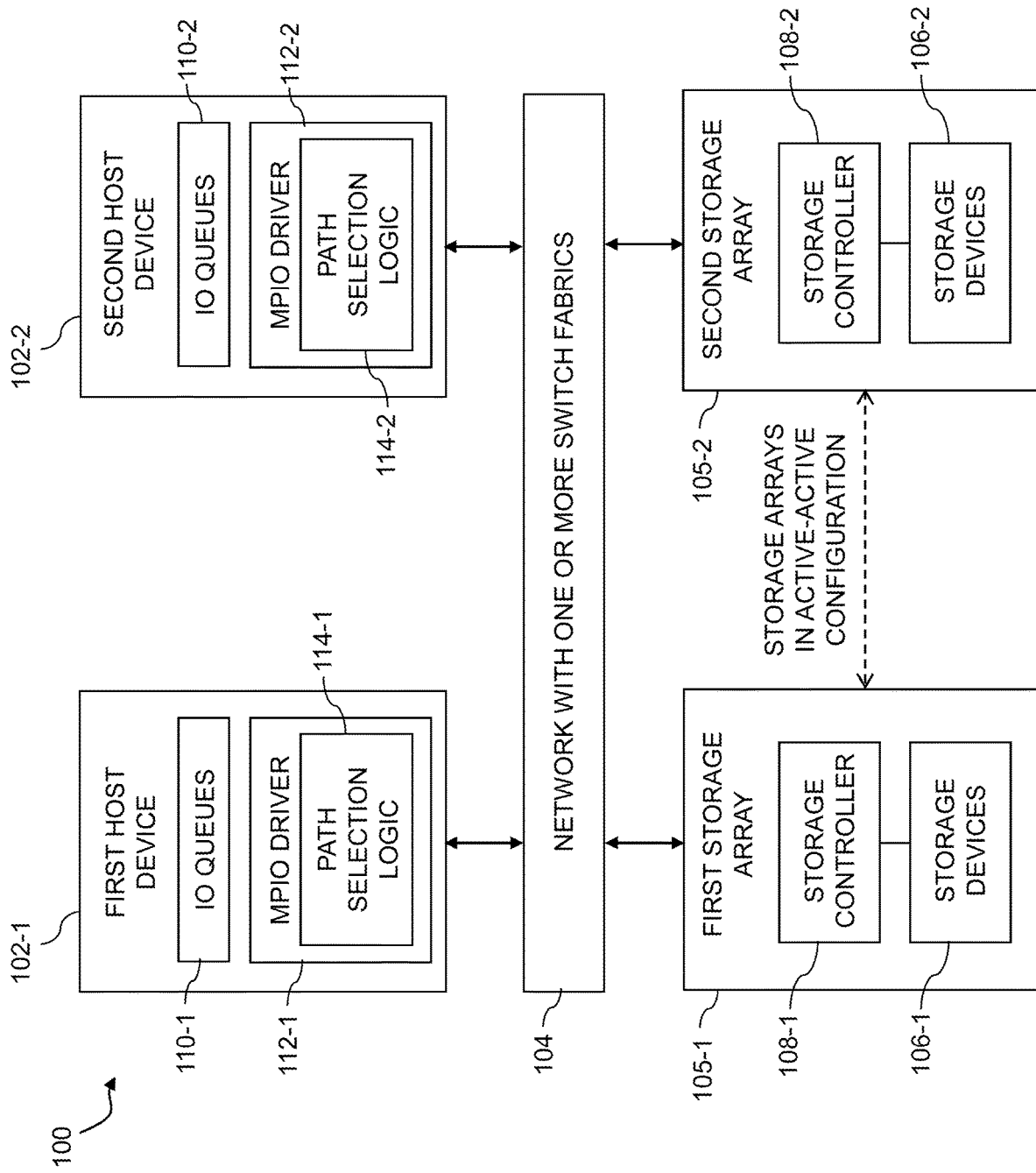
FIG. 1 is a block diagram of an information processing system comprising first and second storage arrays configured with functionality for clock synchronization in an active-active configuration in an illustrative embodiment.

FIG. 1 shows an information processing system 100 configured in accordance with an illustrative embodiment. The information processing system 100 comprises at least first and second host devices 102-1 and 102-2. The host devices 102 are coupled to a network 104 that comprises one or more switch fabrics. The host devices communicate over the network 104 via the one or more switch fabrics with at least first and second storage arrays 105-1 and 105-2. For example, the network 104 illustratively comprises at least one storage area network (SAN) and the one or more switch fabrics illustratively comprise respective distinct switch fabrics of a set of multiple switch fabrics interconnecting the host devices 102 with the storage arrays 105 over the one or more SANs. Each of the one or more switch fabrics in some embodiments is associated with a different SAN.

The system 100 may be configured such that the first host device 102-1 communicates with the first storage array 105-1 over a first switch fabric and communicates with the second storage array 105-2 over a second switch fabric. Similarly, the second host device 102-2 can communicate with the first storage array 105-1 over the first switch fabric and communicate with the second storage array 105-2 over the second switch fabric. Numerous other interconnection arrangements are possible.

Although only two host devices 102 and two storage arrays 105 are shown in the figure, this is by way of illustrative example only, and other embodiments can include additional instances of such elements. It is also possible that alternative embodiments may include only a single host device.

The host devices 102 illustratively comprise respective computers, servers or other types of processing devices capable of communicating with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect storage system components. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The storage arrays 105-1 and 105-2 comprise respective sets of storage devices 106-1 and 106-2 coupled to respective storage controllers 108-1 and 108-2.

The storage devices 106 of the storage arrays 105 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage arrays 105 in some embodiments may be implemented as part of cloud infrastructure in the form of a cloud-based system such as an Amazon Web Services (AWS) system. Other examples of cloud-based systems that can be used to provide at least portions of the storage arrays 105 and possibly other portions of system 100 include Google Cloud Platform (GCP) and Microsoft Azure.

The storage arrays 105 may each additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. The term "storage device" as used herein is therefore intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 105 may each be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

The sets of storage devices 106 of the respective storage arrays 105 store data utilized by one or more applications running on one or more of the host devices 102. The sets of storage devices 106 are illustratively arranged in one or more storage pools. The storage arrays 105 and their respective sets of storage devices 106 are examples of what are more generally referred to herein as "storage systems." A given such storage system in the present embodiment may be shared by the host devices 102, and in such arrangements may be referred to as a "shared storage system."

The sets of storage devices 106 of the storage arrays 105 implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104. Such commands in some embodiments more particularly comprise Small Computer System Interface (SCSI) commands, although other types of commands may be used in other embodiments, including commands that are part of a standard command set, or custom commands such as a "vendor unique command" or VU command that is not part of a standard command set. A given input-output (IO) operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to stored data of a given one of the storage arrays 105.

Also, the term "storage device" as broadly used herein can encompass, for example, a logical storage device such as a LUN or other logical storage volume. A logical storage device can be defined in the storage arrays 105 to include different portions of one or more physical storage devices. The sets of storage devices 106 may therefore be viewed as comprising respective LUNs or other logical storage volumes.

Each of the host devices 102 illustratively has multiple paths to each of the storage arrays 105 via the network 104, with at least one storage device of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

Additional examples of processing platforms utilized to implement storage systems and possibly one or more associated host devices in illustrative embodiments will be described in more detail below in conjunction with FIGS. 6 and 7.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

In some embodiments, at least one of the storage arrays 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage arrays 105 in other embodiments.

The term "storage system" as used herein is therefore intended to be broadly construed, and should not be viewed as being limited to content addressable storage systems or flash-based storage systems. A given storage system as the term is broadly used herein can comprise, for example, the above-noted SANs, network-attached storage (NAS), direct-attached storage (DAS) or distributed DAS, as well as combinations of these and other storage types, including software-defined storage.

Other particular types of storage products that can be used in implementing storage arrays 105 in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The storage arrays 105-1 and 105-2 are assumed to be arranged in an active-active configuration. In such an arrangement, data stored in one of the storage arrays is replicated to the other one of the storage arrays utilizing a replication process. Such data replication across the multiple storage arrays 105 can be used to facilitate failure recovery in the system 100. One of the storage arrays may therefore operate as a production storage array relative to the other storage array which operates as a backup or recovery storage array.

In the present embodiment, it is assumed that the storage arrays 105-1 and 105-2 participate in a replication process that more particularly comprises a synchronous replication process. In accordance with the synchronous replication process, a given one of the host devices 102 writes data to one of the storage arrays 105, and that host device receives an acknowledgement of success only after the data has been successfully written to both of the storage arrays 105. For example, if the host device directs a write to the first storage array 105-1, that storage array mirrors the write to the second storage array 105-2 and receives an acknowledgement of success back from the second storage array 105-2. The first storage array 105-1 then responds back to the host device with an acknowledgement of success.

The synchronous replication process is therefore configured to mirror data writes from one or more of the host devices 102 to both of the storage arrays 105. Other types of replication processes may be used in other embodiments.

For example, a "replication process" as that term is broadly used herein may include both asynchronous and synchronous replication modes as well as support for concurrent operation of such modes and separate operation of the individual modes. It is also possible in some embodiments that a given replication process implemented using storage arrays 105 may comprise only synchronous replication or only asynchronous replication, instead of multiple distinct replication modes.

It is assumed that the storage controllers 108 of the respective storage arrays 105 each comprise replication control logic and a snapshot generator. The replication control logic controls performance of the above-noted synchronous replication process. The snapshot generator is used to generate snapshots of one or more storage volumes that are subject to synchronous replication in conjunction with active-active storage clustering.

The snapshots generated by the storage controllers 108 of the storage arrays 105 illustratively comprise respective point-in-time (PIT) replicas of the storage volumes. Multiple snapshots generated over time for a given storage volume can collectively comprise a "snapshot group" and information characterizing those snapshots in some embodiments is stored in the form of a snapshot tree or other arrangement of one or more data structures suitable for storing information characterizing a snapshot group. In some embodiments, a snapshot tree for a storage volume is configured to add a new node each time a new snapshot is generated for that storage volume. The term "snapshot" as used herein is intended to be broadly construed, and in some embodiments may encompass a complete PIT replica or other types of information characterizing the state of a given storage volume at a particular time.

A given storage volume designated for synchronous replication between storage arrays 105 in the system 100 illustratively comprises a set of one or more LUNs or other storage volumes of the storage arrays 105. Each such LUN or other storage volume is assumed to comprise at least a portion of a physical storage space of one or more of the storage devices 106 of the corresponding storage arrays 105.

The host devices 102 comprise respective sets of IO queues 110-1 and 110-2, and respective multi-path input-output (MPIO) drivers 112-1 and 112-2. The MPIO drivers 112 collectively comprise a multi-path layer of the host devices 102. The multi-path layer provides automated path selection functionality using respective instances of path selection logic 114-1 and 114-2 implemented within the MPIO drivers 112.

The MPIO drivers 112 may comprise, for example, PowerPath drivers from Dell EMC. Other types of MPIO drivers from other driver vendors may be utilized in illustrative embodiments.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. Other types of sources of IO operations may be present in a given implementation of system 100.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

The above-described functions associated with automated path selection functionality of the MPIO driver 112-1 are illustratively carried out at least in part under the control of its path selection logic 114-1.

It is assumed that the other MPIO driver 112-2 is configured in a manner similar to that described above and elsewhere herein for the first MPIO driver 112-1. The MPIO driver 112-2 is therefore similarly configured to select IO operations from its corresponding one of the sets of JO queues 110 for delivery to the storage arrays 105 over the network 104 and to perform the disclosed automated path selection functionality. Accordingly, automated path selection functionality described above in the context of the first MPIO driver 112-1 is assumed to be similarly performed by the other MPIO driver 112-2. The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein.

As will be described in more detail below, the storage arrays 105 are further configured to perform additional operations associated with active-active storage clustering functionality that illustratively utilize clock synchronization to allow the first and second storage arrays 105 to maintain consistent views of TTL values.

The first storage array 105-1 is assumed to be configured as a "leader" and provides a limited-time license or other type of TTL grant to the second storage array 105-2 configured as a "follower." An exemplary TTL grant illustratively allows the follower to service JO operations received from one or more of the host devices 102 concurrently with the leader, such that both the leader and the follower are servicing JO operations. The active-active storage clustering approach in some embodiments ensures that the leader can effectively revoke the TTL grant to the follower even in the presence of link failures or other communication issues that prevent the leader from communicating with the follower. The leader and follower designations of respective storage arrays 105-1 and 105-2 are arbitrary, and can be reversed in other embodiments, or may periodically change under other conditions.

In performing synchronous replication in an active-active configuration, the two storage arrays 105 are illustratively configured to allow one of the host devices 102 to read from and write to a given storage volume. The host device illustratively sees the given storage volume as a single storage volume across the two storage arrays 105 that are arranged in the active-active configuration. All relevant parameters of the separate instances of the given storage volume maintained by the separate storage arrays 105 should therefore be the same in each of the storage arrays 105. Read IO operations directed to the storage volume are serviced by the storage array receiving those operations. Write IO operations directed to the storage volume are executed by the storage array receiving those operations, and are additionally replicated by the receiving storage array to its peer. The two storage arrays 105 in the present embodiment therefore expose the same storage volume with the same data.

Absent use of active-active storage clustering functionality as disclosed herein, problems can arise in an active-active replication arrangement of the type described above. For example, there may be a communication failure between the storage arrays 105. Under this condition, the storage array designated as the follower should stop responding to IO operations, illustratively in conjunction with expiration of any TTL grant that it may have been granted, while the other storage array designated as the leader should continue to respond to IO operations but only after it is guaranteed that the follower has stopped responding to IO operations. Since the storage arrays 105 cannot communicate directly during the communication failure, this problem is not easily solved. Additionally, any pause in responding to host IO operations should be brief, since host timeout values are typically on the order of seconds.

Illustrative embodiments disclosed herein address this problem by providing highly efficient synchronization between local clocks of the respective storage arrays. The active-active storage clustering functionality disclosed herein illustratively makes use of the resulting clock synchronization to facilitate replication.

The clock synchronization and/or active-active storage clustering functionality implemented by the storage arrays 105 of system 100 will now be described in further detail with reference to the block diagram of FIG. 2 and the flow diagrams of FIGS. 3 and 4.

Figure 2:
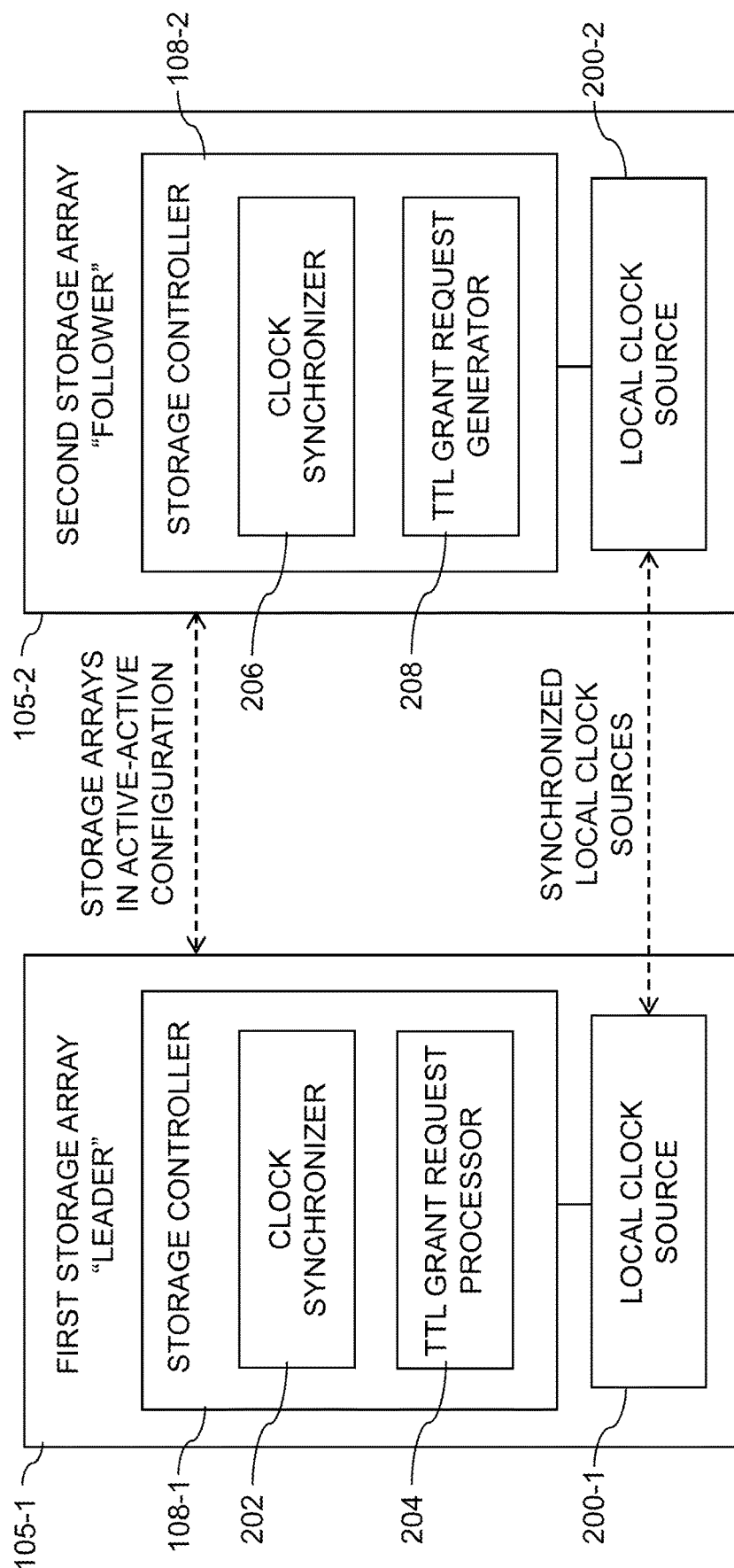
FIG. 2 shows a more detailed view of the first and second storage arrays of FIG. 1.

Referring initially to FIG. 2, the first and second storage arrays 105-1 and 105-2 have respective local clock sources 200-1 and 200-2 that are assumed to be synchronized using their respective clock synchronizers 202 and 206. In other words, there is at least some degree of synchronization between the local clock sources 200 of the storage arrays 105 in the present embodiment. As will be described in more detail below, illustrative embodiments are configured to provide efficient techniques for synchronizing the local clock sources 200. It is to be appreciated that terms such as "synchronize" and "synchronization" as used herein are intended to be broadly construed, so as to encompass explicit synchronization as well as various types of partial or loose synchronization between the local clock sources 200. In some embodiments, the clock synchronizers 202 and 206 provide such synchronization by their respective execution of the algorithm of FIG. 3.

As noted above, the first and second storage arrays 105-1 and 105-2 are illustratively designated as "leader" and "follower" respectively.

The storage controller 108-1 of the first storage array 105-1 comprises the above-noted clock synchronizer 202 and a TTL grant request processor 204. The clock synchronizer 202 performs the clock synchronization algorithm of FIG. 3. The TTL grant request processor 204 processes TTL grant requests from the second storage array 105-2. In some embodiments, a TTL projection time is maintained by the storage controller 108-1 of first storage array 105-1 for use in conjunction with handling TTL grants.

The storage controller 108-2 of the second storage array 105-2 comprises the above-noted clock synchronizer 206 and a TTL grant request generator 208. The clock synchronizer 206 performs the clock synchronization algorithm of FIG. 3. The TTL grant request generator 208 generates TTL grant requests that are sent from the second storage array 105-2 to the first storage array 105-1 for processing. In some embodiments, a TTL expiration time is maintained by the storage controller 108-2 of second storage array 105-2 for use in conjunction with handling TTL grants.

The first and second storage arrays 105 in the active-active configuration are assumed to service IO operations received from at least one of the host devices and directed to a designated consistency group comprising one or more logical storage volumes subject to replication in accordance with the replication process. A TTL grant received by the second storage array 105-2 in response to its request illustratively controls a period of time for which the second storage array 105-2 is permitted to service the IO operations.

The local time in the first storage array 105-1 is derived from the local clock source 200-1 of the first storage array 105-1. Similarly, the local time in the second storage array 105-2 is derived from the local clock source 200-2 of the second storage array 105-2. Again, these local clock sources are assumed to be synchronized.

The manner in which such synchronization is provided in illustrative embodiments will now be described in further detail. The corresponding operations are performed at least in part by the clock synchronizers 202 and 206.

The first storage array 105-1 initiates a given iteration of a clock synchronization algorithm by sending a clock synchronization message to the second storage array 105-2.

In conjunction with sending the clock synchronization message, the first storage array 105-1 records a first value of a local time in the first storage array 105-1. For example, the first value of the local time in the first storage array 105-1 can be recorded at the time the clock synchronization message is sent, at the time the message is generated, or at another suitable time bearing a particular relation to the sending of the message.

In conjunction with receiving a response to the clock synchronization message from the second storage array 105-2, the first storage array 105-1 records a second value of the local time in the first storage array 105-1. For example, the second value of the local time in the first storage array 105-1 can be recorded at the time the response to the clock synchronization message is received, at the time the response is processed, or at another suitable time bearing a particular relation to the receiving of the response.

The response to the clock synchronization message is assumed to comprise a value of a local time in the second storage array 105-2. For example, the response in some embodiments comprises an acknowledgement message that includes the value of the local time in the second storage array 105-2. As another example, the response can comprise multiple messages, such as a first message that comprises an acknowledgement message and a second message that includes the value of the local time in the second storage array 105-2. Numerous other types of responses using one or more messages are possible.

The first storage array 105-1 computes an estimate of a difference between the local times in the respective first and second storage arrays 105 based at least in part on the recorded first and second values of the local time in the first storage array 105-1 and the received value of the local time in the second storage array 105-2. The first storage array 105-1 utilizes the computed estimate to synchronize its local time with the local time in the second storage array 105-2. Again, such synchronization can be a partial or loose synchronization. Additionally or alternatively, such synchronization in some embodiments can involve an adjustment to one or more parameters of the local clock source 200-1.

In some embodiments, the computed estimate of the difference between the local times in the respective first and second storage arrays 105 is given by a difference between: (i) the received value of the local time in the second storage array 105-2, and (ii) a quantity $(p_1+p_2)/2$, where $p_1$ and $p_2$ are the respective recorded first and second values of the local time in the first storage array 105-1. Alternative functions of the received value of the local time in the second storage array 105-2 and the recorded first and second values of the local time in the first storage array 105-1 can be used to compute the estimate of the difference between the local times in other embodiments.

The computed estimate of the difference between the local times in the respective first and second storage arrays 105 in some embodiments deviates from an actual difference between the local times in the respective first and second storage arrays 105 by no more than a maximum error that is a function of the recorded first and second values of the local time in the first storage array 105-1. The maximum error is on the order of a round-trip messaging delay between the first and second storage arrays 105. The computed estimate of the difference illustratively deviates from the actual difference by no more than the maximum error regardless of a magnitude of the actual difference.

For example, in some embodiments, the maximum error is given by $(p_2-p_1)/2$ where as noted above $p_1$ and $p_2$ are the respective recorded first and second values of the local time in the first storage array 105-1.

The above-noted operations of sending a clock synchronization message, recording first and second values, computing an estimate and synchronizing the local times are illustratively repeated by the first storage system 105-1 for each of a plurality of additional iterations at expiration of respective designated time intervals. For example, the clock synchronization algorithm can be performed once for each of a plurality of predetermined fixed-length time intervals (e.g., once each hour). Such intervals are also referred to herein as synchronization periods.

The foregoing describes the operations of the clock synchronization algorithm as being performed by the first storage system 105-1 relative to the second storage system 105-2. Analogous operations are illustratively performed by the second storage system 105-2 relative to the first storage system 105-1. Thus, both of the storage arrays 105 compute estimates of the difference between their respective local times, and utilize those computed estimates in maintaining synchronization.

Figure 3:
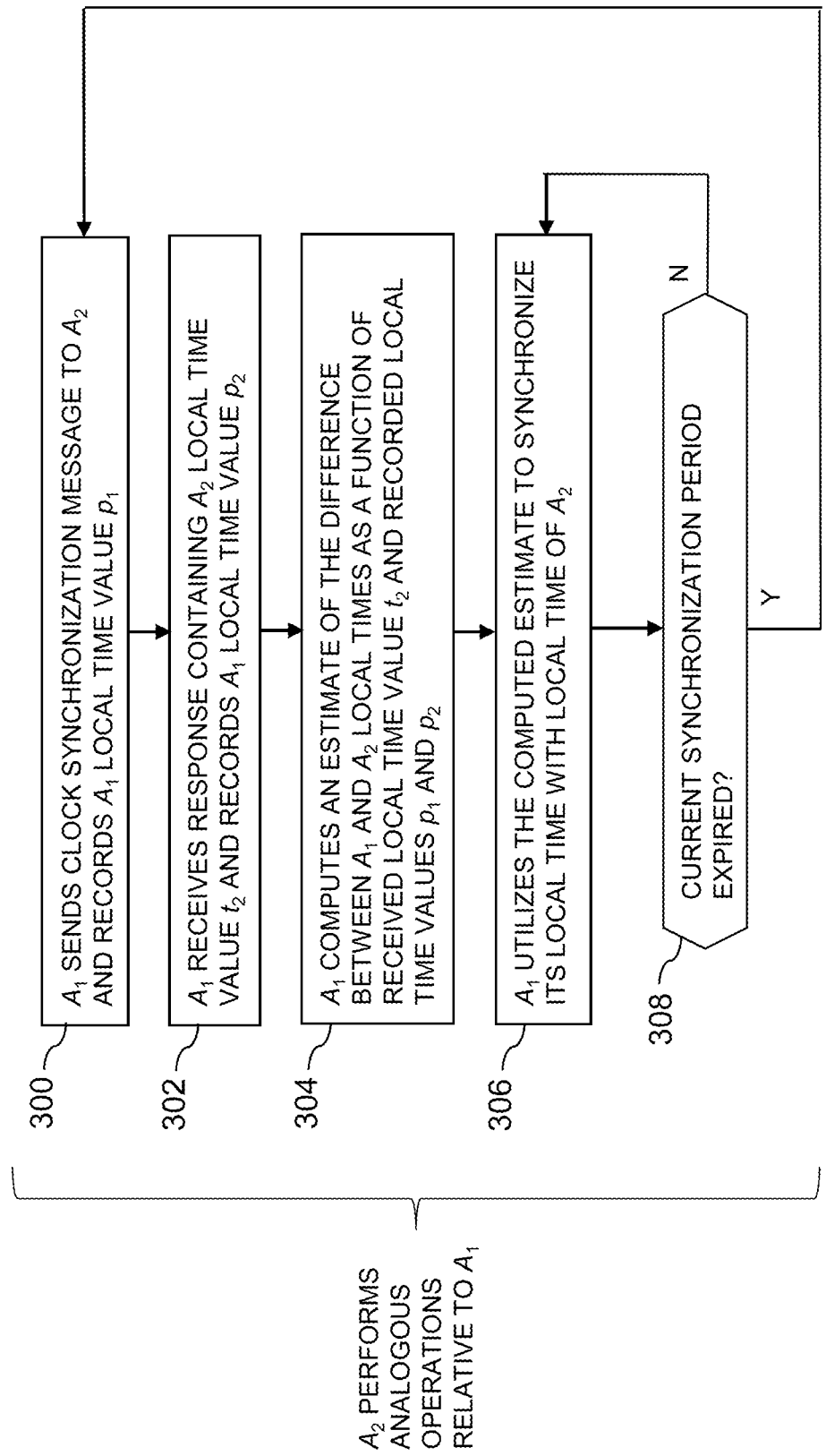
FIG. 3 is a flow diagram of an algorithm for clock synchronization in an active-active configuration in an illustrative embodiment.

FIG. 3 shows an example of a clock synchronization algorithm of the type described above. The algorithm includes steps 300 through 308, which are illustratively performed by or otherwise under the control of the clock synchronizer 202 of the first storage array 105-1 and involve interaction with the second storage array 105-2.

Analogous operations are assumed to be performed by or otherwise under the control of the clock synchronizer 206 of the second storage array 105-2 and involve interaction with the first storage array 105-1.

The first and second storage arrays 105 in this embodiment are more particularly denoted as respective storage arrays $A_1$ and $A_2$. Steps 300 through 308 are therefore assumed to be performed by $A_1$ relative to $A_2$, and it is further assumed that $A_2$ performs analogous operations relative to $A_1$.

The arrays $A_1$ and $A_2$ have respective local clock sources (e.g., hardware clocks) that indicate respective local times $T_1$ and $T_2$. It is assumed for purposes of the present example that the local clock sources are generally reliable, operate at the same clock rate, and have a very small daily drift (e.g., less than 100 ms a day). The clock synchronization algorithm to be described can accommodate an unlimited time difference between the two local clock sources. For example, it is possible that the two local clock sources may be located in two different time zones, such that their difference is measured in hours. Again, such time differences do not interfere with the operation of the clock synchronization algorithm.

The particular steps 300 through 308 of the FIG. 3 clock synchronization algorithm will now be described. As mentioned above, these steps can be repeated for multiple iterations at respective periodic intervals (e.g., once each hour) or other types of intervals.

In step 300, $A_1$ sends a clock synchronization message to $A_2$ and records a corresponding $A_1$ local time value $p_1$. For example, the local time value $p_1$ illustratively comprises the sending time of the clock synchronization message.

In step 302, $A_1$ receives a response from $A_2$ and records a corresponding $A_1$ local time value $p_2$. For example, the local time value $p_2$ illustratively comprises the receiving time of an acknowledgement of the clock synchronization message. The response is assumed to contain an $A_2$ local time value denoted $t_2$. Thus, $p_1$ and $p_2$ are time values in the local time $T_1$ of $A_1$, and $t_2$ is a time value in the local time $T_2$ of $A_2$.

Although step 302 as illustrated assumes that $A_1$ receives a response from $A_2$ within a designated timeout period, if $A_1$ does not receive a response from $A_2$ within the designated timeout period, the process can return to step 300 to repeat the sending of the clock synchronization message. This return is not explicitly shown in the figure.

In step 304, $A_1$ computes an estimate of the difference between the local times $T_1$ and $T_2$ of $A_1$ and $A_2$ as a function of the received local time value $t_2$ and the recorded local time values $p_1$ and $p_2$.

For example, $A_1$ knows that sometime between $p_1$ and $p_2$, the local time at $A_2$ was $t_2$, and so $A_1$ can estimate that $t_2$ was recorded at $A_2$ around the $T_1$ time $(p_1+p_2)/2$. The computed estimate in this case is given by:

$$D_1 = t_2 - (p_1+p_2)/2$$

The computed estimate $D_1$ in this example is an estimate of the time difference $T_1-T_2$ between the local times at $A_1$ and $A_2$. This number can be positive or negative. The computed estimate $D_1$ is subject to a maximum error $E_1$ given by:

$$E_1 = (p_2-p_1)/2.$$

The maximum error $E_1$ is a positive number that provides an exact upper limit on the error in $D_1$. In other words, the difference between $D_1$ and the actual time difference $T_1-T_2$ is not bigger than $E_1$. Mathematically, $$|D_1-|T_1-T_2|| \le E_1$$

The clock synchronization algorithm in the present example ensures that $E_1$ is on the order of the messaging roundtrip time.

As mentioned elsewhere herein, $A_2$ performs analogous operations, and is therefore assumed to compute corresponding $D_2$ and $E_2$ values.

In step 306, $A_1$ utilizes the computed estimate to synchronize its local time with the local time of $A_2$. The term "synchronize" as used here and elsewhere herein is intended to be broadly construed, and can include various arrangements for taking into account the difference between the local times as reflected in the computed estimate. Actual adjustment of a local clock source is possible but not required.

In step 308, a determination is made as to whether or not a current synchronization period has expired. If the current synchronization period has not yet expired, the process returns to step 306 as indicated so as to continue to utilize the current computed estimate for synchronization. If the period has expired, the process returns to step 300 to send another clock synchronization message to initiate generation of a new computed estimate for the next synchronization period. The synchronization periods may be predetermined fixed intervals or other types of intervals, possibly including variable intervals the expiration of which occur only upon satisfaction of one or more specified conditions.

As an illustration of the operation of the FIG. 3 clock synchronization algorithm, consider an arrangement in which $A_1$ is located in Boston and $A_2$ is located in London. The time difference between their respective locations is therefore known to be 5 hours. It is further assumed that the respective local clock sources of $A_1$ and $A_2$ are very accurate and completely in synchronization. In other words, it is known that the actual time difference between their local clock sources is exactly 5 hours. At 6 am, $A_1$ sends a clock synchronization message to $A_2$ and records the local time at $A_1$ as $p_1$=06:00:00:000 (hour/min/sec/ms). Assume the clock synchronization message is received 30 ms later, and $A_2$ records its time $t_2$=11:00:00:020 and sends an acknowledgement containing $t_2$ to $A_1$. Due to a router delay, $A_1$ receives the acknowledgement 200 ms later, at $p_2$=06:00:00:220. $A_1$ estimates that $t_2$ was recorded in $A_2$ at $(p_1+p_2)/2$=06:00:00:110, and computes an estimated difference $D_1$=11:00:00:020−06:00:00:110=4:59:59:910, which is off by only 90 ms compared with the actual time difference of 5:00:00:000. The maximum error in this example is $E_1$= $(p_2-p_1)/2$=110 ms.

The FIG. 3 clock synchronization algorithm, like other processes disclosed herein, is presented for purposes of illustration only, and can be varied in other embodiments.

The synchronized local times resulting from performance of the FIG. 3 clock synchronization algorithm by the first and second storage systems 105-1 and 105-2 are illustratively used to facilitate processing of TTL grant requests received in the first storage system 105-1 from the second storage system 105-2 in accordance with the previously-described active-active replication process.

For example, the first storage array 105-1 in some embodiments receives a request for a TTL grant from the second storage array 105-2, determines a TTL grant value based at least in part on the synchronized local time, and sends the TTL grant value to the second storage array 105-2 in response to the request.

The TTL grant value in some embodiments comprises a TTL expiration time in the local time of the second storage array 105-2. Embodiments of this type will now be described in more detail.

In some of these embodiments, the first storage array 105-1 computes an estimate of a difference between local times in the respective first and second storage arrays 105 in the manner previously described in conjunction with FIG. 3 above. The first storage array 105-1 utilizes the computed estimate to determine a TTL expiration time in the local time in the second storage array 105-2, and sends a TTL grant with the TTL expiration time to the second storage array 105-2 in response to the TTL grant request.

The computed estimate of the difference between the local times in the respective first and second storage arrays 105 is illustratively utilized in the first storage array 105-1 to determine a range for the local time in the second storage array 105-2. For example, the range determined in the first storage array 105-1 for the local time in the second storage array 105-2 in some embodiments is given by:

$$T_1+D_1-E_1 \leq T_2 \leq T_1+D_1+E_1,$$

where, as indicated previously herein, $T_1$ and $T_2$ are the local times in the respective first and second storage arrays 105, $D_1$ is the computed estimate of the difference between the local times in the respective first and second storage arrays 105, and $E_1$ is a maximum error between $D_1$ and an actual difference between the local times in the respective first and second storage arrays 105.

Similarly, a range determined in the second storage array 105-2 for the local time in the first storage array 105-1 in some embodiments is given by:

$$T_2+D_2-E_2 \leq T_1 \leq T_2+D_2+E_2$$

where $D_2$ and $E_2$ denote the difference estimate and maximum error values computed by the second storage array 105-2, which correspond to the $D_1$ and $E_1$ values computed by the first storage array 105-1.

In some embodiments, utilizing the computed estimate in the first storage array 105-1 to determine a TTL expiration time in the local time in the second storage array 105-2 comprises estimating the local time in the second storage array 105-2 from the range, and determining the TTL expiration time based at least in part on the estimated local time in the second storage array 105-2. Other techniques for utilizing the computed estimate to determine a TTL expiration time can be used.

A TTL expiration time maintained in the second storage array 105-2 is updated based at least in part on the TTL expiration time received from the first storage array 105-1 with the TTL grant. For example, updating the TTL expiration time maintained in the second storage array 105-2 comprises setting the TTL expiration time maintained in the second storage array 105-2 to the greater of: (a) a current value of the TTL expiration time maintained in the second storage array 105-2; and (b) the TTL expiration time received from the first storage array 105-1 with the TTL grant.

The TTL expiration time maintained in the second storage array 105-2 specifies an expiration time in the second storage array 105-2 of the TTL grant received from the first storage array 105-1. The second storage array 105-2 terminates its servicing of input-output operations directed to a consistency group comprising one or more logical storage volumes responsive to a current local time at the second storage array 105-2 reaching the TTL expiration time maintained in the second storage array 105-2.

Continuing with the example described above in conjunction with FIG. 3, all TTL grants sent from $A_1$ to $A_2$ can include TTL expiration times specified in terms of the local time at $A_2$, based on the computed estimate of the difference between the local times of $A_1$ and $A_2$ as computed by $A_1$. $A_2$ ignores as invalid any TTL grant having a TTL expiration time that is prior to the current local time at $A_2$. For all other TTL grants, $A_2$ updates its maintained TTL expiration time to the maximum of the current TTL expiration time and the TTL expiration time specified in the TTL grant.

In some embodiments, the computed estimate of the difference between the local times in the respective first and second storage arrays 105 is utilized in the first storage array 105-1 to determine a TTL projection time, with the TTL projection time specifying a time after which it is guaranteed that the TTL grant sent by the first storage array 105-1 to the second storage array 105-2 will have expired in the second storage array 105-2 in accordance with the TTL expiration time maintained in the second storage array 105-2.

It is assumed that the first storage array 105-1 is configured to determine if a cluster state of the active-active configuration of the first and second storage arrays 105 is "up" or "down," where up and down denote the two possible cluster states, and can be viewed as corresponding generally to an "on" state in which the active-active configuration is engaged, and an "off" state in which the active-active configuration is suspended. Such functionality can be part of the TTL grant request processor 204.

Accordingly, the first storage array 105-1 can utilize the TTL projection time maintained in the first storage array 105-1 in conjunction with revocation of the TTL grant to the second storage array 105-2. In some embodiments, the first storage array 105-1 can know with certainty when any TTL grant previously provided to the second storage array 105-2 will be considered expired by the second storage array 105-2 and is therefore effectively revoked by the first storage array 105-1.

For example, the first storage array 105-1 can suspend the active-active configuration by setting a cluster state of the active-active configuration to down, queuing IO operations from at least one of the host devices 102, and responsive to the local time in the first storage array 105-1 exceeding the TTL projection time, resuming servicing of the IO operations in the first storage array 105-1.

Other types of utilization of the TTL projection time can be implemented in the first storage array 105-1. The TTL projection time effectively indicates an amount of time after which the TTL grant is guaranteed to be considered expired by the second storage array 105-2, such that there is no possibility that the second storage array 105-2 will still be processing IO operations after the first storage array 105-1 believes that the TTL grant has expired.

With reference again to the example described above in conjunction with FIG. 3, $A_1$ can keep a copy of the last TTL grant it sent to $A_2$ for use in maintaining its TTL projection time. If $A_1$ wants to evict $A_2$ from the active-active cluster, it stops sending new TTL grants to $A_2$. $A_1$ can then safely know that, once its TTL projection time has expired, any previous TTL grants to $A_2$ have already expired.

The TTL projection time in an embodiment of this type is illustratively given by a sum of the TTL expiration time in the last TTL grant sent to $A_2$ plus the maximum error value $E_1$. Other types of TTL projection times based at least in part on the computed estimate of the difference between the local times in $A_1$ and $A_2$ can be used.

Various types of messaging can be used to convey the requests and responses between the storage arrays 105. For example, the request for a TTL grant can be transmitted using at least one message sent from the second storage array 105-2 to the first storage array 105-1, and the corresponding TTL grant can be transmitted using at least one message sent from the first storage array 105-1 to the second storage array 105-2. The messaging used to convey requests from the second storage array 105-2 to the first storage array 105-1 and to convey corresponding TTL grants from the first storage array 105-1 to the second storage array 105-2 can be implemented using any of a variety of command formats or communication protocols, such as the above-noted SCSI commands or other types of vendor unique or non-standard commands, possibly transmitted directly over a Fibre Channel connection between the two storage arrays or indirectly via one or more switch fabrics of the network 104.

Again, the leader-follower designations assumed above can be reversed, with the second storage array 105-2 being the leader and the first storage array 105-1 being the follower. The various operations performed by each storage array as described previously would then be interchanged. Each of the first and second storage arrays 105-1 and 105-2 can therefore include both a TTL grant request processor and a TTL grant request generator, so as to support its multiple possible roles as respective leader and follower.

The above-described example operations associated with clock synchronization and/or active-active storage clustering in the system 100 are illustratively performed by or otherwise under the control of the storage controllers 108 of the respective storage arrays 105, utilizing their respective clock synchronizers 202 and 206 and their respective TTL grant request processor 204 and TTL grant request generator 208.

It is to be appreciated that these and other features of illustrative embodiments are presented by way of example only, and should not be construed as limiting in any way. Accordingly, different numbers, types and arrangements of system components such as host devices 102, network 104, storage arrays 105, storage devices 106, storage controllers 108, IO queues 110 and MPIO drivers 112 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, various aspects of the above-described clock synchronization and/or active-active storage clustering functionality can be implemented in one or more host devices, or partially in a host device and partially in a storage system. Accordingly, illustrative embodiments are not limited to arrangements in which all such functionality is implemented in a storage system or a host device, and therefore encompass various hybrid arrangements in which the functionality is distributed over one or more storage systems and one or more associated host devices, each comprising one or more processing devices.

The active-active storage clustering operation of the information processing system 100 will now be described in further detail with reference to the flow diagrams of the illustrative embodiment of FIG. 4.

Figure 4A:
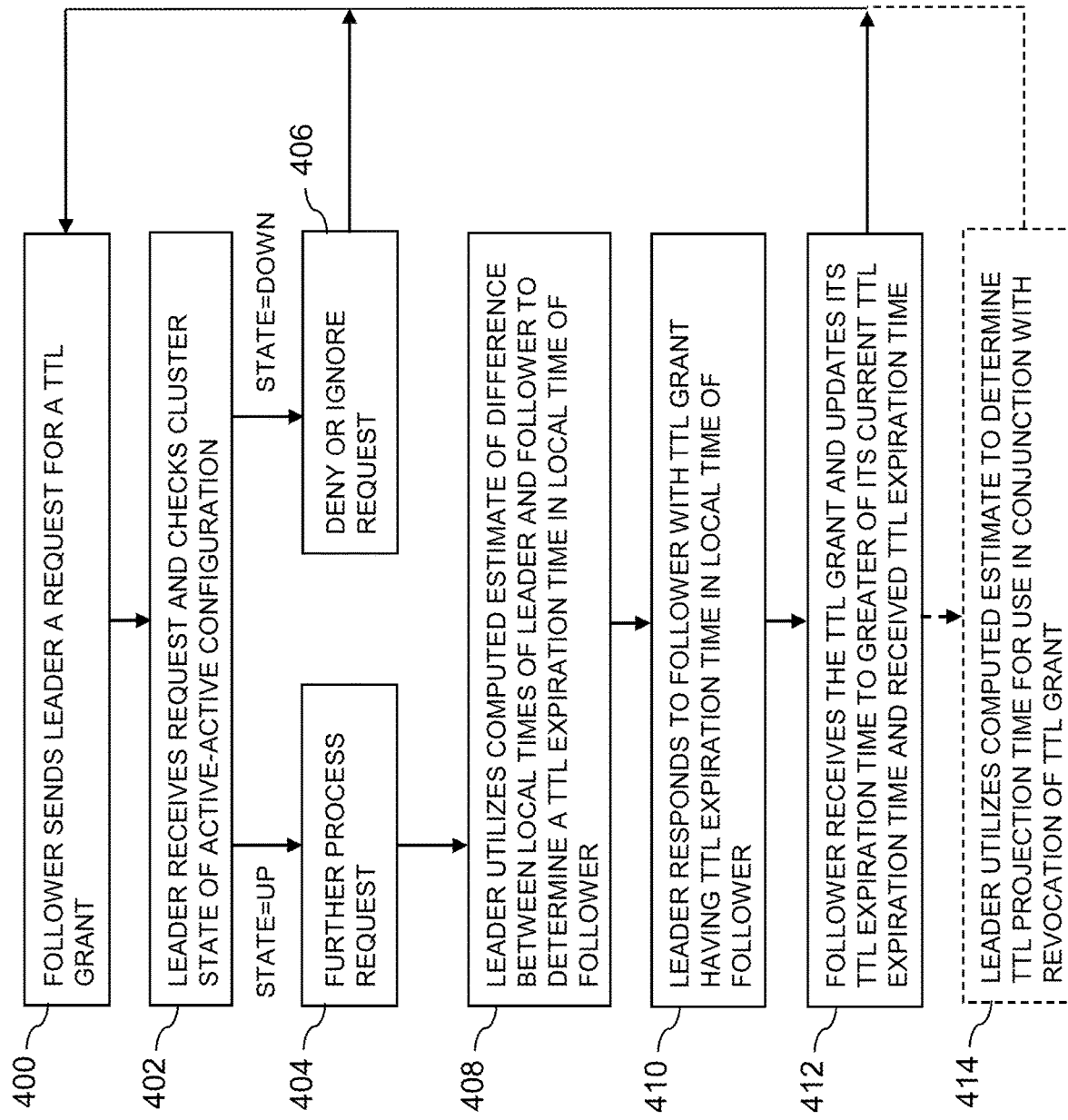
FIGS. 4A and 4B are flow diagrams of respective algorithms performed in conjunction with active-active storage clustering in an illustrative embodiment. These figures are collectively referred to herein as FIG. 4.
Figure 4B:
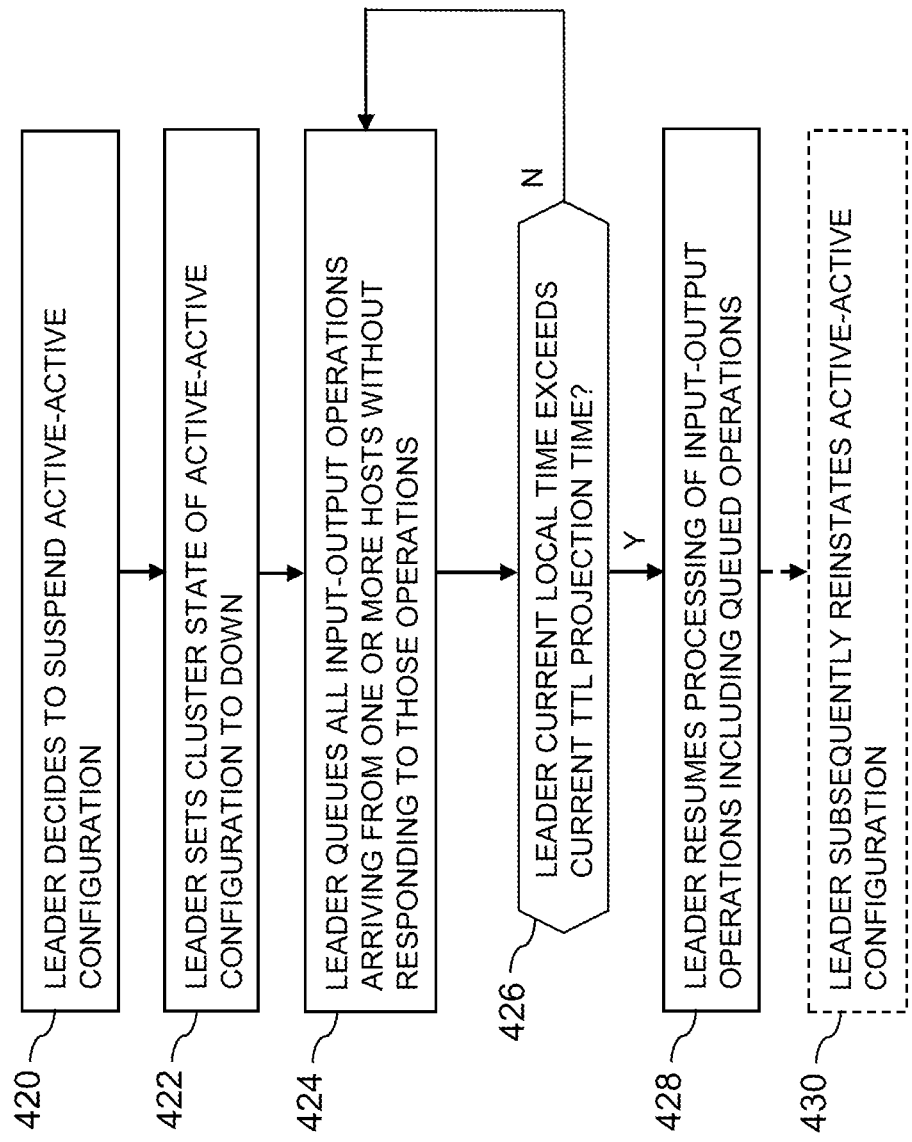

As mentioned previously, FIG. 4 comprises FIGS. 4A and 4B, each illustrating a different algorithm associated with implementation of active-active storage clustering functionality. These algorithms are suitable for use in the system 100 but are more generally applicable to other types of information processing systems each comprising at least one host device and first and second storage systems arranged in an active-active configuration. The first and second storage systems in this embodiment are more particularly assumed to comprise respective first and second storage arrays arranged in an active-active configuration, with each storage array having a plurality of storage devices. The storage devices can include logical storage devices such as LUNs or other logical storage volumes. The first and second storage arrays are assumed to be designated as "leader" and "follower" respectively as in the FIG. 2 embodiment, although that scenario can be reversed in other embodiments.

The algorithms illustrated in FIGS. 4A and 4B implement different portions of an example active-active storage clustering process. The steps of the process are illustratively performed primarily by the first and second storage arrays, such as the first and second storage arrays 105 in system 100, although other arrangements of system components can perform at least portions of one or more of the steps in other embodiments. For example, in some embodiments parts of one or both of the algorithms can be carried out by a host device.

Referring now to FIG. 4A, an algorithm for processing a request for a TTL grant is shown. This portion of the process includes steps 400 through 414.

In step 400, the second storage array ("follower") sends a request to the first storage array ("leader") for a TTL grant.

In step 402, the leader receives the request and checks the cluster state of the active-active configuration. As described previously, the cluster state is illustratively either "up" or "down" although other types and arrangements of cluster state designations can be used in other embodiments. If the cluster state is up, the process moves to step 404 to continue with further processing of the request, and otherwise moves to step 406 in which the request is denied or ignored.

From step 404 the process moves to step 408, and from step 406 the process returns to step 400.

In step 408, the leader utilizes a computed estimate of the difference between the local times of the leader and follower to determine a TTL expiration time in the local time of the follower. The computed estimate is illustratively the $D_1$ estimate described previously herein, which is subject to a maximum error $E_1$.

In step 410, the leader responds to the follower with a TTL grant having the TTL expiration time in the local time of the follower. The TTL grant illustratively gives the follower temporary permission to process IO operations directed to a consistency group comprising one or more storage volumes, concurrently with the processing of such IO operations by the leader.

In step 412, the follower receives the TTL grant and updates its TTL expiration time to the greater of its current TTL expiration time and the TTL expiration time received with the TTL grant from the leader. The TTL expiration time represents a time in the future after which the TTL grant having the TTL grant value will expire. The TTL grant illustratively gives the follower permission to service IO operations arriving from one or more hosts as long as a given such IO operation is received by the follower at a time that is prior to the TTL expiration time. The TTL grant thus allows the follower to service the IO operations until the TTL expiration time is reached, at which point all IO operations directed to the consistency group are suspended at the follower. The leader will continue to process IO operations directed to the consistency group independently of the follower.

Any IO operations received by the follower after the TTL expiration time has been reached are illustratively rejected by the follower. The follower under such a condition can trigger performance of a consistency group "trip" process that will terminate its servicing of IO operations for all storage volumes of the consistency group in the active-active configuration.

After completion of step 412, the process returns to step 400, in which the follower can request a subsequent TTL grant at an appropriate time.

The FIG. 4A algorithm illustratively includes in some cases a further step 414 in which the leader utilizes a TTL projection time in conjunction with revocation of the TTL grant. For example, as previously described, the leader can utilize the TTL projection time to determine definitively a particular time after which the TTL grant provided in step 410 is guaranteed to be considered expired by the follower and is therefore effectively revoked by the leader, even if there is a communication failure between the leader and follower. After performance of step 414, the process also returns to step 400 in which the follower can again request a TTL grant, for example, after the communication failure is resolved. Although step 414 is shown in dashed outline in this embodiment, that should not be construed as an indication that any other particular ones of the steps are required.

The above-described algorithm is advantageously configured to ensure that messaging delays between the leader and the follower will not cause the leader, the follower or both to misinterpret the actual TTL grant. Messaging delays in illustrative embodiments will therefore not cause improper TTL grant.

Turning now to FIG. 4B, an algorithm is shown that illustrates one example of a manner in which the leader utilizes the TTL projection time in conjunction with revocation of the TTL grant. More particularly, the algorithm of FIG. 4B illustrates how the leader utilizes the TTL projection time in suspending the active-active configuration. This portion of the process includes steps 420 through 430, and is implemented in its entirety by the leader, without any involvement of the follower.

In step 420, the leader determines that the active-active configuration should be suspended. For example, such a determination may be made responsive to detection of a communication failure between the leader and the follower, or under other conditions that indicate a potential issue with the processing of IO operations by the follower. The determination to suspend the active-active configuration can additionally or alternatively be made in order to "trip" the consistency group and terminate replication in a manner that prevents the follower from servicing any IO operations from the one or more hosts.

Under such conditions, the leader effectively revokes the TTL grant to the follower by allowing it to expire, such that the leader will become the exclusive processor of IO operations received from the one or more hosts. It is important in such an arrangement for the leader to know definitively a particular time after which the TTL grant is guaranteed to be considered expired by the follower, such that the follower is no longer processing IO operations received from the one or more hosts. As there may be a communication failure between the leader and the follower, the leader needs to be able to revoke the TTL grant in this manner without being required to communicate in any way with the follower.

In step 422, the leader sets the cluster state of the active-active configuration to down. The leader will not provide any further TTL grants to the follower as long as the cluster state of the active-active configuration is down.

In step 424, the leader queues all IO operations arriving from the one or more hosts without responding to those operations. It is therefore assumed in this embodiment that the leader maintains one or more sets of queues for queuing IO operations arriving from the one or more hosts, similar to the IO queues 110 of the hosts 102 in FIG. 1.

In step 426, the leader checks if its current local time, as determined from its local clock source, exceeds the current TTL projection time maintained by the leader. While waiting for this particular condition to be satisfied, the process returns to step 424 such that the leader continues to queue arriving IO operations. After the condition in step 426 is satisfied, it is guaranteed that the TTL grant previously provided to the follower will be considered expired by the follower, such that the follower is no longer processing IO operations received from the one or more hosts, and the process moves to step 428 as indicated.

In step 428, the leader resumes processing of IO operations arriving from the one or more hosts. This includes processing of any IO operations that were previously queued by the leader without response in step 424.

The FIG. 4B algorithm illustratively includes in some cases a further step 430 in which the leader subsequently reinstates the active-active configuration. For example, the leader can reinstate the active-active configuration after a communication failure between the leader and follower has been resolved. The leader can then once again receive and respond to requests from the follower for TTL grants. Again, although step 430 is shown in dashed outline in this embodiment, that should not be construed as an indication that any other particular ones of the steps are required.

The particular processing operations and other system functionality described in conjunction with the flow diagrams of FIGS. 3 and 4 are presented by way of illustrative example only, and should not be construed as limiting the scope of the disclosure in any way. Alternative embodiments can use other types of processing operations for clock synchronization and/or active-active storage clustering. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different clock synchronization processes and/or active-active storage clustering processes for respective different storage systems or portions thereof within a given information processing system.

Functionality such as that described in conjunction with the flow diagrams of FIGS. 3 and 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, storage controllers such as storage controllers 108 of storage arrays 105 that are configured to control performance of one or more steps of the FIG. 3 clock synchronization process and/or the FIG. 4 active-active storage clustering process in the system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or LXCs. The storage controllers 108, as well as other system components, may be implemented at least in part using processing devices of such processing platforms. For example, in a distributed implementation of a given one of the storage controllers 108, respective distributed modules of such a storage controller can be implemented in respective containers running on respective ones of the processing devices of a processing platform.

In some embodiments, the storage system comprises an XtremIO™ storage array or other type of content addressable storage system suitably modified to incorporate clock synchronization and/or active-active storage clustering techniques for an active-active configuration as disclosed herein.

An illustrative embodiment of such a content addressable storage system will now be described with reference to FIG. 5. In this embodiment, a content addressable storage system 505 comprises a plurality of storage devices 506 and an associated storage controller 508. The content addressable storage system 505 may be viewed as a particular implementation of a given one of the storage arrays 105, and accordingly is assumed to be coupled to the other one of the storage arrays 105 and to one or more of the host devices 102 within the information processing system 100.

The storage controller 508 in the present embodiment is configured to implement clock synchronization and/or active-active storage clustering functionality of the type previously described herein. For example, the content addressable storage system 505 illustratively participates in a synchronous replication process with another instance of the content addressable storage system 505, with the two storage systems being arranged in an active-active configuration relative to one another.

The storage controller 508 includes distributed module 512, which is configured to perform operations associated with the clock synchronization and/or active-active storage clustering functionality, such as operations similar to those illustrated in one or more of the flow diagrams of FIGS. 3 and 4. The distributed module 512 more particularly comprises distributed replication control logic with clock synchronization and/or active-active storage clustering support. The distributed module 512 illustratively comprises multiple replication control logic instances on respective ones of a plurality of distinct nodes.

Figure 5:
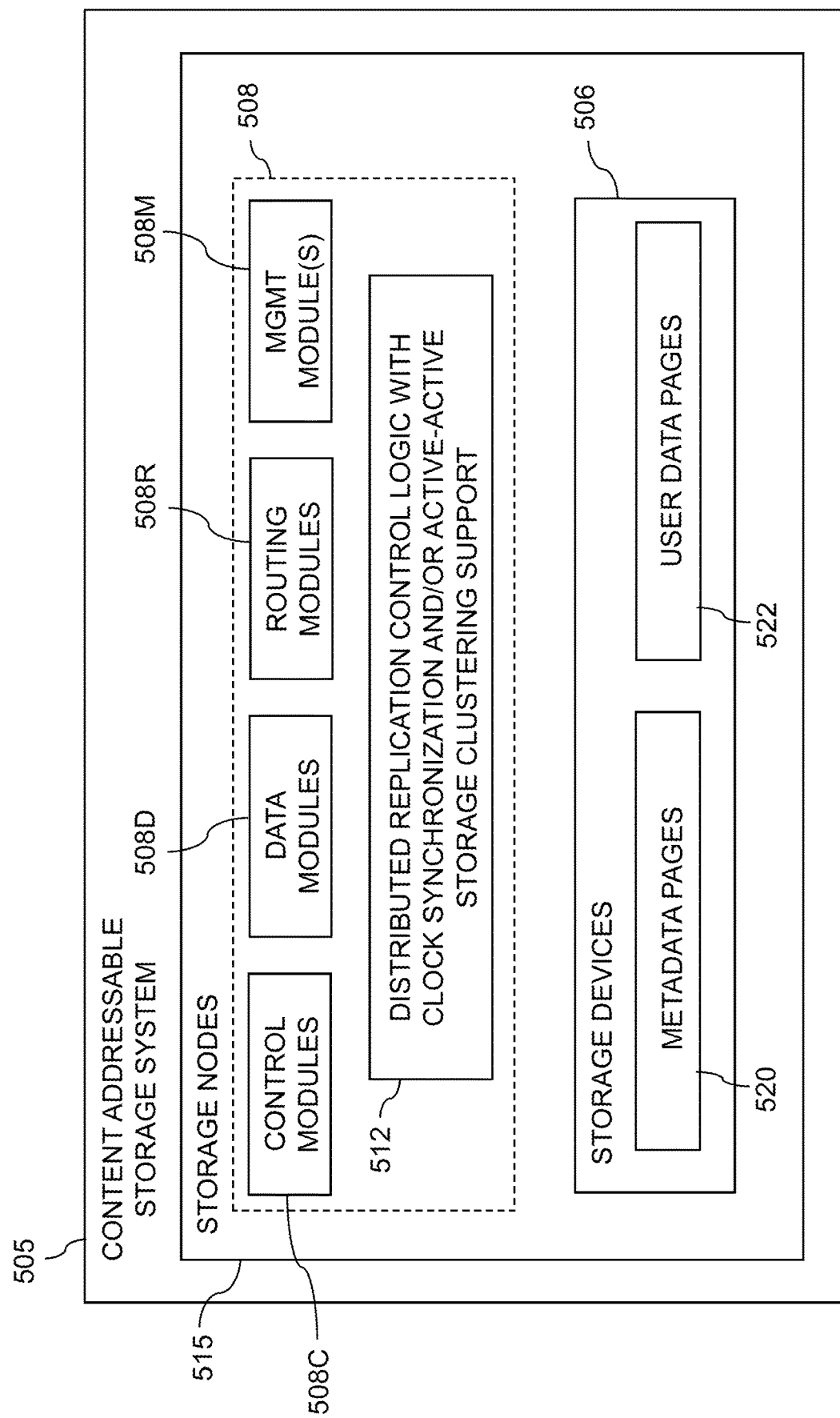
FIG. 5 shows a content addressable storage system having a distributed storage controller configured with functionality for clock synchronization in an active-active configuration in an illustrative embodiment.

The content addressable storage system 505 in the FIG. 5 embodiment is implemented as at least a portion of a clustered storage system and includes a plurality of storage nodes 515 each comprising a corresponding subset of the storage devices 506. Such storage nodes 515 are examples of the "distinct nodes" referred to above, and other clustered storage system arrangements comprising multiple storage nodes and possibly additional or alternative nodes can be used in other embodiments. A given clustered storage system may therefore include not only storage nodes 515 but also additional storage nodes, compute nodes or other types of nodes coupled to network 104. Alternatively, such additional storage nodes may be part of another clustered storage system of the system 100. Each of the storage nodes 515 of the storage system 505 is assumed to be implemented using at least one processing device comprising a processor coupled to a memory.

The storage controller 508 of the content addressable storage system 505 is implemented in a distributed manner so as to comprise a plurality of distributed storage controller components implemented on respective ones of the storage nodes 515. The storage controller 508 is therefore an example of what is more generally referred to herein as a "distributed storage controller." In subsequent description herein, the storage controller 508 may be more particularly referred to as a distributed storage controller.

Each of the storage nodes 515 in this embodiment further comprises a set of processing modules configured to communicate over one or more networks with corresponding sets of processing modules on other ones of the storage nodes 515. The sets of processing modules of the storage nodes 515 collectively comprise at least a portion of the distributed storage controller 508 of the content addressable storage system 505.

The modules of the distributed storage controller 508 in the present embodiment more particularly comprise different sets of processing modules implemented on each of the storage nodes 515. The set of processing modules of each of the storage nodes 515 comprises at least a control module 508C, a data module 508D and a routing module 508R. The distributed storage controller 508 further comprises one or more management ("MGMT") modules 508M. For example, only a single one of the storage nodes 515 may include a management module 508M. It is also possible that management modules 508M may be implemented on each of at least a subset of the storage nodes 515.

Each of the storage nodes 515 of the storage system 505 therefore comprises a set of processing modules configured to communicate over one or more networks with corresponding sets of processing modules on other ones of the storage nodes. A given such set of processing modules implemented on a particular storage node illustratively includes at least one control module 508C, at least one data module 508D and at least one routing module 508R, and possibly a management module 508M. These sets of processing modules of the storage nodes collectively comprise at least a portion of the distributed storage controller 508.

Communication links may be established between the various processing modules of the distributed storage controller 508 using well-known communication protocols such as IP, Transmission Control Protocol (TCP), and remote direct memory access (RDMA). For example, respective sets of IP links used in data transfer and corresponding messaging could be associated with respective different ones of the routing modules 508R.

Although shown as a separate module of the distributed storage controller 508, the module 512 in the present embodiment is assumed to be distributed at least in part over at least a subset of the other modules 508C, 508D, 508R and 508M of the storage controller 508. Accordingly, at least portions of the clock synchronization and/or active-active storage clustering functionality of the module 512 may be implemented in one or more of the other modules of the storage controller 508. In other embodiments, the module 512 may be implemented as a stand-alone module that is completely separate from the other modules of the storage controller 508.

The storage devices 506 are configured to store metadata pages 520 and user data pages 522, and may also store additional information not explicitly shown such as checkpoints and write journals. The metadata pages 520 and the user data pages 522 are illustratively stored in respective designated metadata and user data areas of the storage devices 506. Accordingly, metadata pages 520 and user data pages 522 may be viewed as corresponding to respective designated metadata and user data areas of the storage devices 506.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 520 and the user data pages 522.

The user data pages 522 are part of a plurality of LUNs configured to store files, blocks, objects or other arrangements of data, each also generally referred to herein as a "data item," on behalf of users of the content addressable storage system 505. Each such LUN may comprise particular ones of the above-noted pages of the user data area. The user data stored in the user data pages 522 can include any type of user data that may be utilized in the system 100. The term "user data" herein is therefore also intended to be broadly construed.

A given storage volume subject to replication in an active-active configuration with clock synchronization and/or active-active storage clustering functionality implemented using module 512 illustratively comprises a set of one or more LUNs of the content addressable storage system 505, each including multiple ones of the user data pages 522 stored in storage devices 506.

The content addressable storage system 505 in the embodiment of FIG. 5 is configured to generate hash metadata providing a mapping between content-based digests of respective ones of the user data pages 522 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 522. The hash metadata generated by the content addressable storage system 505 is illustratively stored as metadata pages 520 in the metadata area. The generation and storage of the hash metadata is assumed to be performed under the control of the storage controller 508.

Each of the metadata pages 520 characterizes a plurality of the user data pages 522. For example, a given set of user data pages representing a portion of the user data pages 522 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 506.

Each of the metadata pages 520 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 520 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 505 is illustratively distributed among the control modules 508C.

As indicated above, the clock synchronization and/or active-active storage clustering functionality provided by module 512 in this embodiment is assumed to be distributed across multiple distributed processing modules, including at least a subset of the processing modules 508C, 508D, 508R and 508M of the distributed storage controller 508.

For example, the management module 508M of the storage controller 508 may include a replication control logic instance that engages corresponding replication control logic instances in all of the control modules 508C and routing modules 508R in order to implement a synchronous replication process.

In some embodiments, the content addressable storage system 505 comprises an XtremIO™ storage array suitably modified to incorporate techniques for clock synchronization and/or active-active storage clustering as disclosed herein.

In arrangements of this type, the control modules 508C, data modules 508D and routing modules 508R of the distributed storage controller 508 illustratively comprise respective C-modules, D-modules and R-modules of the XtremIO™ storage array. The one or more management modules 508M of the distributed storage controller 508 in such arrangements illustratively comprise a system-wide management module ("SYM module") of the XtremIO™ storage array, although other types and arrangements of system-wide management modules can be used in other embodiments. Accordingly, clock synchronization and/or active-active storage clustering functionality in some embodiments is implemented under the control of at least one system-wide management module of the distributed storage controller 508, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 508C such that control of the slices within the storage controller 508 of the storage system 505 is substantially evenly distributed over the control modules 508C of the storage controller 508.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 505 each illustratively comprise one or more IO operations directing that at least one data item of the storage system 505 be written to in a particular manner. A given write request is illustratively received in the storage system 505 from a host device over a network. In some embodiments, a write request is received in the distributed storage controller 508 of the storage system 505, and directed from one processing module to another processing module of the distributed storage controller 508. For example, a received write request may be directed from a routing module 508R of the distributed storage controller 508 to a particular control module 508C of the distributed storage controller 508. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 515 communicate with one another over a high-speed internal network such as an InfiniBand network. The C-modules, D-modules and R-modules coordinate with one another to accomplish various IO processing tasks.

The write requests from the host devices identify particular data pages to be written in the storage system 505 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 505 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 505.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 506. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 505 correspond to respective physical blocks of a physical layer of the storage system 505. The user data pages of the logical layer are organized by LBA and have reference via respective content-based signatures to particular physical blocks of the physical layer.

Each of the physical blocks has an associated reference count that is maintained within the storage system 505. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 508C, 508D, 508R and 508M as shown in the FIG. 5 embodiment is presented by way of example only. Numerous alternative arrangements of processing modules of a distributed storage controller may be used to implement clock synchronization and/or active-active storage clustering functionality in a clustered storage system in other embodiments.

Additional examples of content addressable storage functionality implemented in some embodiments by control modules 508C, data modules 508D, routing modules 508R and management module(s) 508M of distributed storage controller 508 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of a storage system with clock synchronization and/or active-active storage clustering functionality as disclosed herein can provide a number of significant advantages relative to conventional arrangements.

For example, some embodiments provide techniques for clock synchronization for storage systems in an active-active configuration.

As another example, some embodiments are advantageously configured to provide accurate and efficient active-active storage clustering for multiple storage systems arranged in an active-active configuration with synchronous replication.

These and other embodiments allow first and second storage systems configured to perform replication in an active-active configuration to maintain consistent views of TTL values using particularly effective techniques for providing synchronization between their respective local clocks.

In some embodiments, clock synchronization is provided based at least in part on a computed estimate of a difference between local times of respective first and second storage systems. The computed estimate of the difference exhibits no more than a maximal error relative to an actual difference between the local times of the respective first and second storage systems. The maximal error is advantageously achieved in some embodiments regardless of a magnitude of the actual difference between the local times.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement storage systems and possibly one or more associated host devices will now be described in greater detail with reference to FIGS. 6 and 7. Although described in the context of system 100, these platforms may also be used to implement at least portions of other information processing systems in other embodiments.

Figure 6:
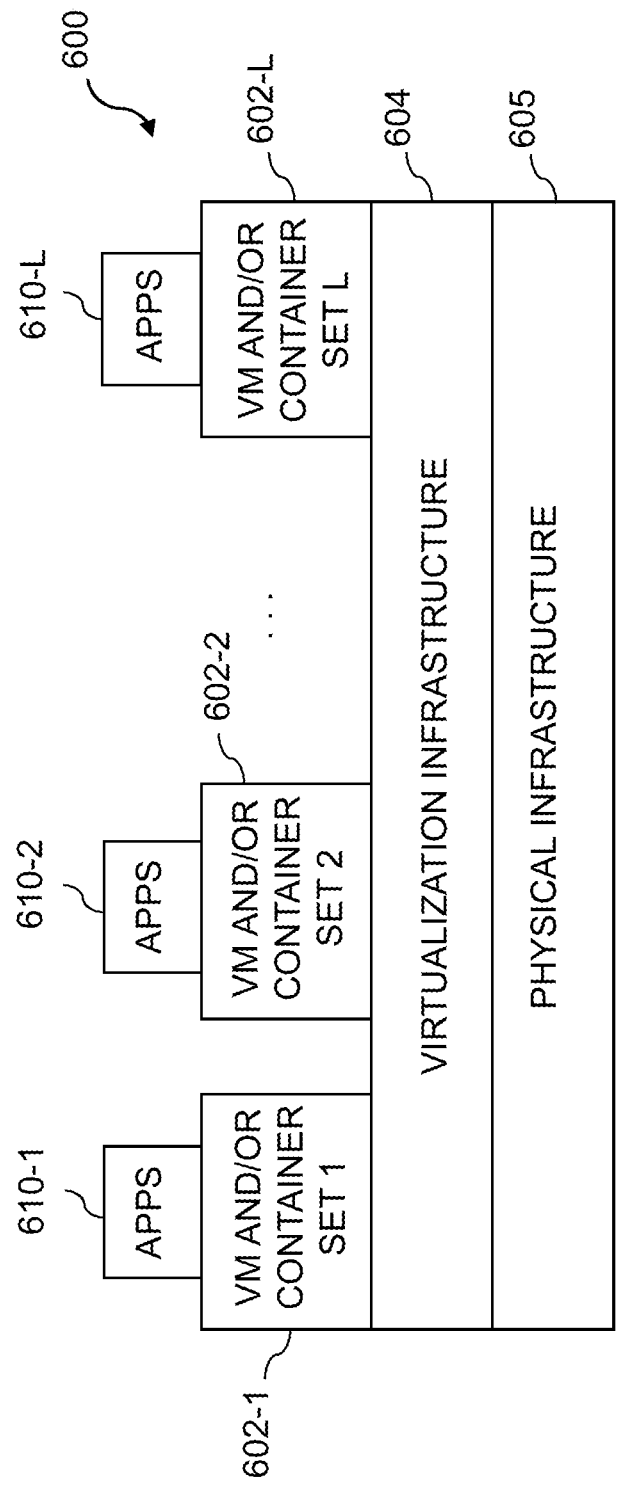
FIGS. 6 and 7 show examples of processing platforms that may be utilized to implement at least a portion of an information processing system in illustrative embodiments.
Figure 7:
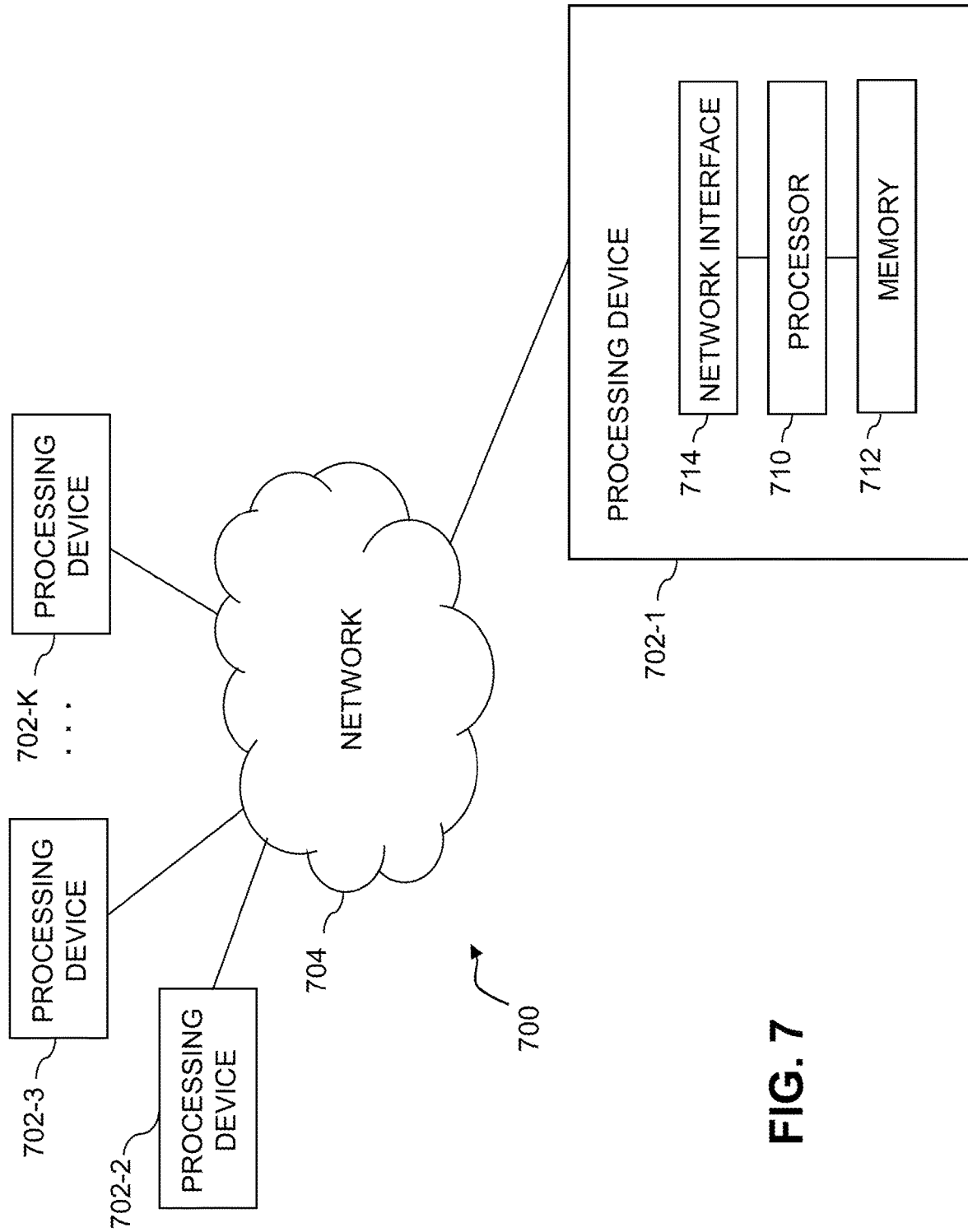

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, ... 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, ... 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide clock synchronization and/or active-active storage clustering functionality of the type described above for one or more processes running on a given one of the VMs. For example, each of the VMs can implement replication control logic with support for clock synchronization and/or active-active storage clustering functionality in the system 100.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide clock synchronization and/or active-active storage clustering functionality of the type described above. For example, a container host device supporting multiple containers of one or more container sets can implement one or more instances of replication control logic with support for clock synchronization and/or active-active storage clustering functionality in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, a central processing unit (CPU), an application-specific integrated circuit (ASIC), a field-programmable gate array (FPGA), a graphics processing unit (GPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the clock synchronization and/or active-active storage clustering functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, replication processes, clock synchronization processes, active-active storage clustering processes and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   said at least one processing device being configured:
   to receive in a first storage system a request for a time-to-live (TTL) grant from a second storage system, the first storage system being configured to participate in a replication process with the second storage system, the first and second storage systems being arranged in an active-active configuration relative to one another;
   to compute in the first storage system an estimate of a difference between local times in the respective first and second storage systems;
   to utilize the computed estimate in the first storage system to determine a TTL expiration time in the local time in the second storage system; and
   to send the TTL grant with the TTL expiration time from the first storage system to the second storage system in response to the request.

2. The apparatus of claim 1 wherein said at least one processing device comprises a storage controller of the first storage system.

3. The apparatus of claim 1 wherein the first and second storage systems in the active-active configuration service input-output operations received from at least one host device and directed to a designated consistency group comprising one or more logical storage volumes subject to replication in accordance with the replication process.

4. The apparatus of claim 3 wherein the TTL grant controls a period of time for which the second storage system is permitted to service the input-output operations.

5. The apparatus of claim 1 wherein the local time in the first storage system is derived from a first clock source of the first storage system.

6. The apparatus of claim 5 wherein the first clock source is synchronized with a second clock source of the second storage system wherein the local time in the second storage system is derived from the second clock source.

7. The apparatus of claim 1 wherein the computed estimate of the difference between the local times in the respective first and second storage systems is utilized in the first storage system to determine a range for the local time in the second storage system.

8. The apparatus of claim 7 wherein the range determined in the first storage system for the local time in the second storage system is given by:

$$T_1+D_1-E_1 \leq T_2 \leq T_1+D_1+E_1,$$

where $T_1$ and $T_2$ are the local times in the respective first and second storage systems, $D_1$ is the computed estimate of the difference between the local times in the respective first and second storage systems, and $E_1$ is a maximum error between $D_1$ and an actual difference between the local times in the respective first and second storage systems.

9. The apparatus of claim 7 wherein utilizing the computed estimate in the first storage system to determine a TTL expiration time in the local time in the second storage system comprises:
   estimating the local time in the second storage system from the range; and
   determining the TTL expiration time based at least in part on the estimated local time in the second storage system.

10. The apparatus of claim 1 wherein a TTL expiration time maintained in the second storage system is updated based at least in part on the TTL expiration time received from the first storage system with the TTL grant.

11. The apparatus of claim 10 wherein updating the TTL expiration time maintained in the second storage system comprises setting the TTL expiration time maintained in the second storage system to the greater of:
   (a) a current value of the TTL expiration time maintained in the second storage system; and
   (b) the TTL expiration time received from the first storage system with the TTL grant.

12. The apparatus of claim 10 wherein the TTL expiration time maintained in the second storage system specifies an expiration time in the second storage system of the TTL grant received from the first storage system.

13. The apparatus of claim 10 wherein the second storage system terminates its servicing of input-output operations directed to a consistency group comprising one or more logical storage volumes responsive to a current local time at the second storage system reaching the TTL expiration time maintained in the second storage system.

14. The apparatus of claim 1 wherein the computed estimate of the difference between the local times in the respective first and second storage systems is utilized in the first storage system to determine a TTL projection time, the TTL projection time specifying a time after which it is guaranteed that the TTL grant sent by the first storage system to the second storage system will have expired in the second storage system in accordance with the TTL expiration time maintained in the second storage system.

15. A method comprising:
   receiving in a first storage system a request for a time-to-live (TTL) grant from a second storage system, the first storage system being configured to participate in a replication process with the second storage system, the first and second storage systems being arranged in an active-active configuration relative to one another;
   computing in the first storage system an estimate of a difference between local times in the respective first and second storage systems;
   utilizing the computed estimate in the first storage system to determine a TTL expiration time in the local time in the second storage system; and
   sending the TTL grant with the TTL expiration time from the first storage system to the second storage system in response to the request;
   wherein the method is implemented by at least one processing device comprising a processor coupled to a memory.

16. The method of claim 15 wherein the computed estimate of the difference between the local times in the respective first and second storage systems is utilized in the first storage system to determine a range for the local time in the second storage system.

17. The method of claim 15 wherein a TTL expiration time maintained in the second storage system is updated based at least in part on the TTL expiration time received from the first storage system with the TTL grant.

18. A computer program product comprising a non-transitory processor-readable storage medium having stored therein program code of one or more software programs, wherein the program code when executed by at least one processing device causes said at least one processing device:
   to receive in a first storage system a request for a time-to-live (TTL) grant from a second storage system; the first storage system being configured to participate in a replication process with the second storage system, the first and second storage systems being arranged in an active-active configuration relative to one another;

to compute in the first storage system an estimate of a difference between local times in the respective first and second storage systems;

to utilize the computed estimate in the first storage system to determine a TTL expiration time in the local time in the second storage system; and to send the TTL grant with the TTL expiration time from the first storage system to the second storage system in response to the request.

19. The computer program product of claim 18 wherein the computed estimate of the difference between the local times in the respective first and second storage systems is utilized in the first storage system to determine a range for the local time in the second storage system.

20. The computer program product of claim 18 wherein a TTL expiration time maintained in the second storage system is updated based at least in part on the TTL expiration time received from the first storage system with the TTL grant.

\* \* \* \* \*